United States Patent

[11] 3,589,669

| [72] | Inventors | Graham Melbourne Wells;<br>Frank Wooffindin, both of Fartown,<br>Huddersfield, England |
|---|---|---|
| [21] | Appl. No. | 778,682 |
| [22] | Filed | Nov. 25, 1968 |
| [45] | Patented | June 29, 1971 |
| [73] | Assignee | Hopkinsons Limited<br>Huddersfield, England |

[54] FLUID FLOW CONTROL RELIEF VALVE
6 Claims, 4 Drawing Figs.

[52] U.S. Cl. .................................................. 251/25,
251/327, 251/61.2, 251/63.4
[51] Int. Cl. .................................................. F16k 31/145
[50] Field of Search .......................................... 251/327,
176, 63.4, 63.5, 61, 61.2

[56] References Cited
UNITED STATES PATENTS
2,399,301  4/1946  Spence ..................... 251/61.2

3,183,926  5/1965  Boudot ....................... 251/176 X
FOREIGN PATENTS
15,976  1896  Great Britain ................ 251/176

*Primary Examiner*—Arnold Rosenthal
*Attorney*—Holman & Stern

ABSTRACT: A relief valve for use as a pilot valve especially but not exclusively in a pump relief valve arrangement and comprising a valve casing with a through-flow passage therethrough for passage of a controlled fluid, a parallel slide valve housed in the casing and slidable relative to the passage to open or close same to allow or prevent flow of the controlled fluid, a spindle passing through a sealing means into the valve casing and connected to the parallel slide valve, and a device for loading the spindle and consequently the parallel slide valve and comprising a housing connected to the valve casing and enclosing a fluid-loaded diaphragm and piston assembly, a piston rod between the diaphragm and piston assembly and the spindle to transmit movements of the assembly to the spindle, and an inlet in the housing for the loading fluid at that side of the housing remote from the valve casing.

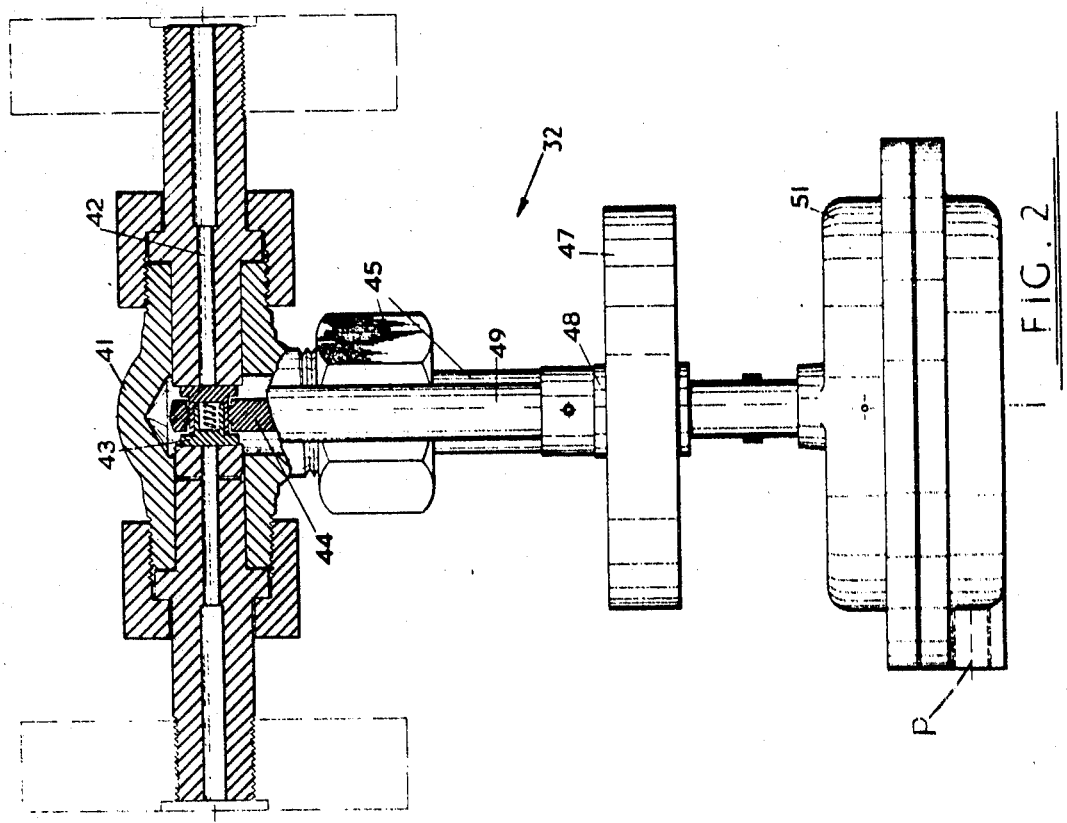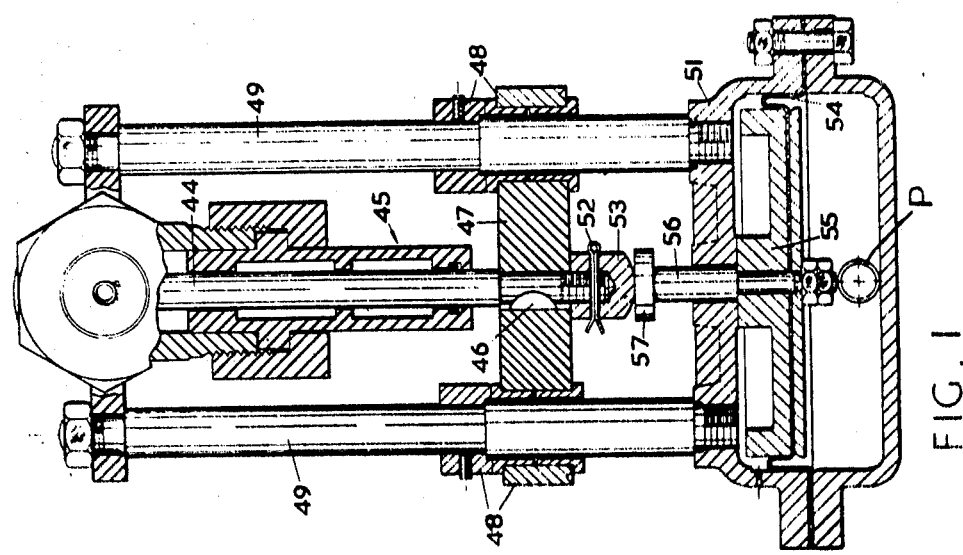

FLUID FLOW CONTROL RELIEF VALVE

BACKGROUND OF THE INVENTION

This invention is concerned with a relief valve arrangement for use with fluid-handling apparatus and especially but not exclusively for use with high-capacity rotary pumps to permit a discharge of fluid when such is necessary to safeguard the pump or other fluid-handling apparatus. The invention is particularly concerned with a pilot valve for use in the relief valve arrangement.

It is customary to provide a rotary pump with a relief valve arrangement adapted to open if an unsafe pressure and/or temperature condition occurs in the pump, and it is an object of the present invention to provide an improved design of such a relief valve arrangement, and in particular a pilot valve for use in such relief valve arrangement.

SUMMARY OF THE INVENTION

According to the present invention, there is provided a relief valve for use as a pilot valve especially but not exclusively in a pump relief valve arrangement and comprising a valve casing with a through-flow passage therethrough for passage of a controlled fluid, a parallel slide valve housed in the casing and slidable relative to the passage to open or close the same to allow or prevent flow of the controlled fluid, a spindle passing through a sealing means into the valve casing and connected to the parallel slide valve, and a device for loading the spindle and consequently the parallel slide valve and comprising a housing connected to the valve casing and enclosing a fluid-loaded diaphragm and piston assembly, a piston rod between the diaphragm and piston assembly and the spindle to transmit movements of the assembly to the spindle, and an inlet in the housing for the loading fluid at the side of the housing remote from the valve casing.

BRIEF DESCRIPTION OF THE DRAWINGS

An embodiment of the present invention will now be described, by way of example, in which:

FIGS. 1 and 2 are respectively a sectional front view and a part sectional side view of a pilot valve according to the present invention; and, FIGS. 3 and 4 are respectively a part sectional side view and front view of a relief valve arrangement incorporating the pilot valve according to the present invention.

DETAILED DESCRIPTION OF THE INVENTION

Figure 4:
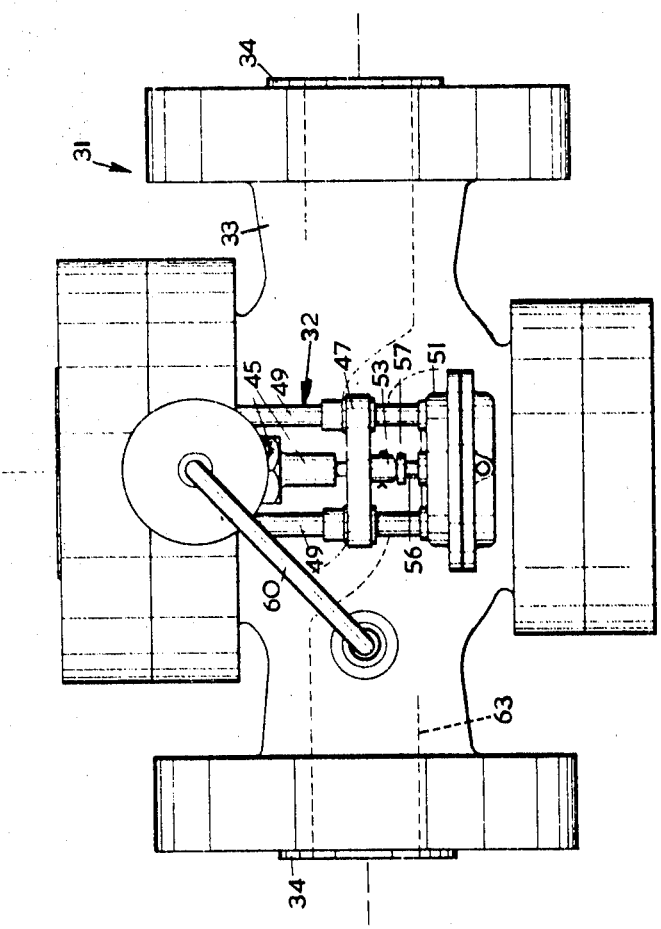
Figure 3:
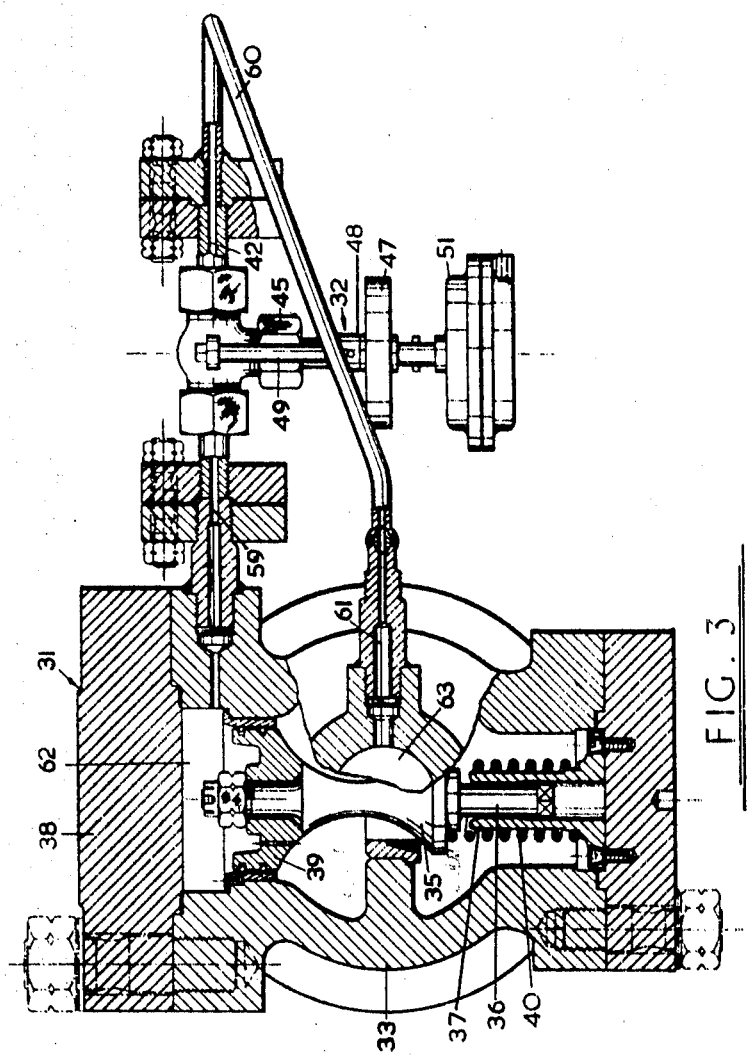

Referring to FIGS. 3 and 4 of the drawings, there is shown a relief valve arrangement consisting of the assembly of a mushroom-type fluid-flow control valve 31 and a parallel slide pilot valve 32 suitable for, for example, pump leak-off duties.

The mushroom-type valve 31 (FIGS. 3 and 4) has a valve body 33 with an inlet and outlet 34, and has internally a valve head 35 with a bottom spindle 36 mounted in a guide 37. The body 33 is closed at the top by a lid 38. The valve head 35 is connected to a piston 39. A spring 40 surrounds the guide 37 and is located between the base flange of the guide 37 and the valve head 35. It serves to overcome the deadweight of the valve head 35 and the piston 39. Such a mushroom-type valve and its operation is well known.

The parallel slide pilot valve 32 is in fluid circuit with the mushroom-type valve 31.

The parallel slide pilot valve 32 (FIGS. 1 and 2) has an upper valve casing 41 having a through-flow passage 42 open at each end, and slidably mounting a spring-loaded disc assembly 43.

The valve disc assembly 43 is connected to a spindle 44 which is slidably carried in a sealing means 45. The spindle 44 is keyed as indicated at 46 to a crossbar 47 having at each end a bushing and collar assembly 48 slidable along pillars 49 connecting the valve casing 41 to a diaphragm chamber 51 located below the valve casing 41.

The valve-remote end of the spindle 44 has secured thereto by screwing, a split pin 52 and a capnut 53.

The diaphragm chamber 51 has mounted therein a loading mechanism comprising a flexible diaphragm 54 to which is secured a relatively thick piston 55 having a short piston rod 56 extending out of the chamber 51 and terminating in a head 57 abutting the capnut 53.

The valve spindle 44 extends through the sealing means 45 so that it is acted upon by the pressure fluid at passage 42 and by atmospheric pressure at that length extending from the sealing means 45 towards the diaphragm chamber 51. In consequence the spindle 44 is unbalanced. More specifically, the spindle is of such a diameter that its unbalanced area is such that when there is fluid pressure within the valve and the fluid-operating mechanism adapted to exert a force on the outer end of the spindle to keep the valve in the closed position is removed, then by reason of the fluid pressure within the valve acting on the unbalanced area spindle, causes the valve to open automatically.

The diaphragm 54 and piston 55 are loaded by compressed air supplied to the diaphragm chamber 51 through port P below the diaphragm/piston assembly to lift the diaphragm/piston assembly 54, 55 so that the piston rod 56 moves the valve spindle 44 upwards to move the valve disc assembly 43 to closed position and maintain it in this position.

The through-flow passage 42 (FIG. 3) is connected at one end to a passage 59 in the valve 31, and at the other end by a pipe 60 to a passage 61 also in the valve 31.

The passage 59 communicates with a chamber 62 in valve 31 at the opposite side of piston 40 from the valve head 35, while the passage 61 communicates with the inlet side of the valve 31 as indicated at 63 (FIG. 4) so that a pressure fluid impulse from the discharge of a pump to which the inlet side of valve 31 is connected is diverted along passage 61 and pipe 60 before the pressure fluid reaches the assembly of the valve head 35 and piston 39.

The valve 31 which, as aforesaid, has its inlet connected to the pump discharge is normally maintained closed by pressure fluid discharge of the pump assisted by the action of the spring 40. The valve 32 is also normally maintained closed by the air pressure acting on the underside of the diaphragm 54 and piston 55. Thus, in normal operation the valves 31 and 32 are closed.

When an unsafe pressure and/or temperature condition occurs in the pump, pressure fluid in the valve 31 flows from chamber 63 through the passage 61 of pipe 60 and into passage 42 in the valve 32 and acts on the unbalanced spindle 44 to cause the spindle 44 and valve disc assembly 43 to move to the open, fail-safe position. The pressure fluid then flows through open pilot valve 32, through passage 59 and into the chamber 62 of the valve 31 to act on the piston 39 and open the valve head 35 thus preventing any possible damage to the pump. When the unsafe condition is removed, the valve 32 is closed by compressed air acting upwardly on the diaphragm and piston 54, 55 whereof their movement is transmitted to the valve spindle 44 and valve disc assembly 43 via rod 56 and head 57. Thus, fluid pressure is cut off from the passage 59 and consequently chamber 62 and the valve head 35 closes due to fluid pressure at the inlet of valve 31 and also the spring 40.

While compressed air is referred to as being the pressure medium for closing the parallel slide pilot valve 32, it will be manifest that any other suitable pressure medium may be employed. Examples of alternative pressure mediums are water under pressure or oil under pressure.

What we claim is:

1. A relief valve for use as a pilot valve especially but not exclusively in a pump relief valve arrangement and comprising a valve casing with a through-flow passage therethrough for passage of a controlled fluid, a parallel slide valve housed in the casing and slidable relative to the passage to open or close the same to allow or prevent flow of the controlled fluid, a sealing means, a spindle passing through said sealing means into the valve casing and connected to the parallel slide valve, and a device for loading the spindle and consequently the parallel slide valve and comprising a housing connected to the valve casing, a fluid-loaded diaphragm and piston assembly within the housing, a piston rod between the diaphragm and piston assembly and the spindle to transmit movements of the assembly to the spindle, and an inlet in the housing for the loading fluid at that side of the housing remote from the valve casing, said valve spindle being acted upon by the fluid in the through-flow passage and by atmospheric pressure at that length of the spindle extending from the sealing means towards the housing whereby the spindle is unbalanced, the spindle being of such diameter that its unbalanced area is such that when there is fluid pressure within the valve and when the force which is exerted on the outer end of the spindle to keep the valve in a closed position, is removed, by reason of the fluid pressure within the valve acting on the unbalanced area of the spindle, the valve opens automatically.

2. The relief valve as claimed in claim 1, in which the parallel slide valve is a pair of discs provided with tubular extensions such that one extension sockets into the other, and a spring enclosed by the tubular extensions and assisting in holding the discs against valve seatings surrounding the through-flow passage.

3. The relief valve as claimed in claim 1, in which the piston rod is connected to the piston with its projecting end abutting the spindle.

4. The relief valve as claimed in claim 1, in which the housing is spaced from and connected to the valve casing by pillars with the valve spindle keyed to a crossbar slidable along the pillars.

5. The relief valve arrangement comprising a relief valve as claimed in claim 1 in fluid communication with a fluid flow control valve and adapted to act as a pilot valve to effect opening of the fluid flow control valve upon occurrence of an unsafe pressure condition in a pump or other fluid-handling apparatus with which the arrangement is operatively associated.

6. The relief valve arrangement as claimed in claim 5, in which the fluid flow control valve has a valve element urged to a closed position by the pressure of a controlled fluid and a piston for operating the valve element against the controlled fluid pressure, with the relief valve being connected to the inlet of the fluid flow control valve and the operating side of the piston so that if the relief valve opens operating fluid pressure is relayed to the operating side of the piston to act on the piston and cause opening of the fluid flow control valve.